United States Patent
Lee et al.

(10) Patent No.: US 10,196,772 B2
(45) Date of Patent: Feb. 5, 2019

(54) CONDENSING TYPE CLOTHES DRYER HAVING A HEAT PUMP CYCLE AND A METHOD FOR CONTROLLING A CONDENSING TYPE CLOTHES DRYER HAVING A HEAT PUMP CYCLE

(71) Applicant: LG ELECTRONICS INC., Seoul (KR)

(72) Inventors: Yongju Lee, Seoul (KR); Daeyun Park, Seoul (KR); Byeongjo Ryoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 14/959,552

(22) Filed: Dec. 4, 2015

(65) Prior Publication Data

US 2016/0160427 A1  Jun. 9, 2016

(30) Foreign Application Priority Data

Dec. 8, 2014  (KR) .......................... 10-2014-0175163

(51) Int. Cl.
*F26B 3/00* (2006.01)
*D06F 58/20* (2006.01)
*D06F 58/28* (2006.01)

(52) U.S. Cl.
CPC ............ *D06F 58/206* (2013.01); *D06F 58/28* (2013.01); *D06F 58/20* (2013.01); *D06F 2058/287* (2013.01); *D06F 2058/2864* (2013.01)

(58) Field of Classification Search
CPC ........ D06F 58/206; D06F 58/28; D06F 58/20; F24F 3/1405

(Continued)

(56) References Cited

U.S. PATENT DOCUMENTS 3,739,487 A   6/1973  Clark
3,750,304 A * 8/1973  Ghadiali ................ D06F 58/20
34/131

(Continued)

FOREIGN PATENT DOCUMENTS

CN   102560986   7/2012
JP   2005-177224  7/2005

(Continued)

OTHER PUBLICATIONS

European Search Report issued in Application Serial 15196538.1 dated Apr. 12, 2016.

(Continued)

*Primary Examiner* — Kenneth Rinehart
*Assistant Examiner* — Bao D Nguyen
(74) *Attorney, Agent, or Firm* — KED & Associates, LLP

(57) ABSTRACT

A condensing type clothes dryer having a heat pump cycle and a method for controlling a condensing type clothes dryer having a heat pump cycle are provided. The condensing type clothes dryer may include a drum in which an object to be dried may be accommodated; a circulation duct that forms a circulation passage such that air may circulate via the drum; a circulation fan configured to circulate the air along the circulation duct; a heat pump cycle having an evaporator and a condenser spaced from each other in the circulation duct, and configured to absorb heat of air discharged from the drum through the evaporator and to transfer the heat to air introduced into the drum through the condenser using an operation fluid which may circulate via the evaporator and the condenser; a bypass flow path formed at the circulation duct such that a portion of air discharged from the drum may bypass the evaporator to be mixed with air having passed through the evaporator at an upstream side of the condenser; and an opening and closing device installed at the bypass (Continued)

flow path and configured to selectively open or close the bypass flow path.

9 Claims, 5 Drawing Sheets

(58) Field of Classification Search
USPC .................................................. 34/443, 77
See application file for complete search history.

(56) References Cited

U.S. PATENT DOCUMENTS

| | | | | | |
|---|---|---|---|---|---|
| 4,196,526 | A | * | 4/1980 | Berti | A23N 12/08 34/396 |
| 4,558,636 | A | * | 12/1985 | Malmstrom | B60H 1/00414 454/158 |
| 5,299,431 | A | * | 4/1994 | Iritani | B60H 1/00021 62/159 |
| 6,000,095 | A | * | 12/1999 | Johnson | B60S 3/002 15/312.1 |
| 2016/0047578 | A1 | * | 2/2016 | Warren | F25B 13/00 62/115 |

FOREIGN PATENT DOCUMENTS

| | | |
|---|---|---|
| JP | 2008-220814 | 9/2008 |
| JP | 2008-220814 A | 9/2008 |
| JP | 2008220814 A * | 9/2008 |
| JP | 2009-018089 A | 1/2009 |
| JP | 2011-092329 | 5/2011 |
| KR | 10-2011-0019095 A | 2/2011 |
| KR | 10-1314241 | 10/2013 |
| WO | WO 2005/075728 | 8/2005 |
| WO | WO 2012/020943 | 2/2012 |
| WO | WO 2012/020943 A2 | 2/2012 |

OTHER PUBLICATIONS

Nurettin Yamankaradeniz et al.: "Performance analysis of a re-circulating heat pump dryer", Thermal Science, [Online] No. 00, Jun. 8, 2014 (Jun. 8, 2014), pp. 69-69, XP055262018, RS, ISSN: 0354-9836, DOI: 10.2298/TSCI130426069Y. Retrieved from the Internet: URL:http://www.doiserbia.nb.rs/img/doi/0354-9836/2014%200nLine-First/0354-98361400069Y.pdf.

Chinese Office Action dated May 22, 2017 issued in Application No. 201510898057.2 (with English translation).

Korean Office Action issued in Application No. 10-2014-0175163 dated Jul. 9, 2015.

* cited by examiner

CONDENSING TYPE CLOTHES DRYER HAVING A HEAT PUMP CYCLE AND A METHOD FOR CONTROLLING A CONDENSING TYPE CLOTHES DRYER HAVING A HEAT PUMP CYCLE

CROSS-REFERENCE TO RELATED APPLICATION(S)

Pursuant to 35 U.S.C. § 119(a), this application claims priority to Korean Application No. 10-2014-0175163, filed in Korea on Dec. 8, 2014, the contents of which is incorporated by reference herein in its entirety.

BACKGROUND

1. Field

A condensing type clothes dryer having a heat pump cycle, and a method for controlling a condensing type clothes dryer having a heat pump cycle are disclosed herein.

2. Background

Generally, a clothes dryer is an apparatus for drying laundry by evaporating moisture contained in the laundry, by blowing a hot blast generated by a heater into a drum. The clothes dryer may be classified into an exhausting type clothes dryer and a condensing type clothes dryer according to a processing method of humid air having passed through a drum after drying laundry.

In the exhausting type clothes dryer, humid air having passed through a drum is exhausted outside of the clothes dryer. On the other hand, in the condensing type clothes dryer, humid air having passed through a drum is circulated without being exhausted outside of the clothes dryer. Then, the humid air is cooled to a temperature less than a dew-point temperature by a condenser, so moisture included in the humid air is condensed.

In the condensing type clothes dryer, condensate water condensed by a condenser is heated by a heater, and then heated air is introduced into a drum. While humid air is cooled to be condensed, thermal energy of air is lost. In order to heat the air to a temperature high enough to dry laundry, an additional heater is required.

In the exhausting type clothes dryer, air of high temperature and high humidity should be exhausted outside of the clothes dryer, and external air of room temperature should be introduced to be heated to a required temperature by a heater. As drying processes are executed, air discharged from an outlet of the drum has low humidity. The air is not used to dry laundry, but rather, is exhausted outside of the clothes dryer. As a result, a heat quantity of the air is lost. This may degrade thermal efficiency.

Recently, a clothes dryer having a heat pump cycle, capable of enhancing energy efficiency by collecting energy discharged from a drum and by heating air introduced into the drum using the energy, has been developed.

FIG. 1 is a schematic view of a related art condensing type clothes dryer having a heat pump cycle. Referring to FIG. 1, the condensing type clothes dryer may include a drum 1 into which laundry may be introduced, a circulation duct 2 that provides a passage such that air circulates via the drum 1, a circulation fan 3 configured to move circulating air along the circulation duct 2, and a heat pump cycle 4 having an evaporator 5 and a condenser 6 serially installed at or along the circulation duct 2 such that air circulating along the circulation duct 2 passes through the evaporator 5 and the condenser 6. The heat pump cycle 4 may include a circulation pipe that may form the circulation passage such that a refrigerant circulates via the evaporator 5 and the condenser 6, and a compressor 7 and an expansion valve 8 installed at or along the circulation pipe between the evaporator 5 and the condenser 6.

In the heat pump cycle 4, thermal energy of air having passed through the drum 1 may be transferred to a refrigerant via the evaporator 5, and then the thermal energy of the refrigerant may be transferred to air introduced into the drum 1 via the condenser 6. With such a configuration, a hot blast may be generated using thermal energy discarded by the conventional exhausting type clothes dryer or lost in the conventional condensing type clothes dryer.

FIG. 2 is a schematic view illustrating a flow of air passing through the evaporator 5 and the condenser 6, in a related art condensing type clothes dryer to which the heat pump cycle 4 has been applied. Referring to FIG. 2, air discharged from the drum 1 may pass through the evaporator 5 and the condenser 6 sequentially, along the circulation duct 2. The circulation duct 2 and the evaporator 5 (or the condenser 6) may be formed to have no gap therebetween, such that a largest amount of air passes through the evaporator 5 and the condenser 6. Such a configuration is advantageous in that a drying time and an the amount of energy used may be reduced, as heat exchange efficiency is enhanced as a speed of air passing through the evaporator 5 and the condenser 6 and a heat transfer coefficient are increased.

However, such a structure where there is no gap between the circulation duct 2 and a heat exchanger (including the evaporator 5 and the condenser 6) may have the following problems. Generally, as a temperature of the outlet of the drum 1 is increased during a drying process, an evaporation pressure of a refrigerant evaporated by the evaporator 5, and a condensation pressure of a refrigerant condensed by the condenser 6 are increased. Further, in a case in which an amount of a drying load is large or an amount of water contained in an object to be dried is large, a condensation pressure may be increased to a value more than a reliable pressure of the compressor 7 as a drying process is executed. As a result, a condensation temperature of the condenser 6 and a discharge temperature of the compressor 7 are increased, which may cause many problems. Accordingly, the condensation temperature of the condenser 6 and the discharge temperature of the compressor 7 are controlled to be lower than a predetermined value.

More specifically, the following methods may be performed. For example, an inverter compressor may be formed to have its rpm changeable. Thus, if a condensation pressure of a condenser is increased, an rpm of the inverter compressor may be controlled to be lower than a reference condensation pressure. However, in the inverter compressor, as a DC power is used as a driving power source, a driver for converting an AC power into a DC power and converting a current frequency into a required frequency should be installed. This may increase fabrication costs.

FIG. 3 is a view illustrating that a secondary condenser and a cooling fan may be added to a heat pump cycle applied to a related art condensing type clothes dryer. A secondary condenser 26 and a cooling fan 23 may be mounted adjacent to a primary condenser 16 of the heat pump cycle 4. When a temperature of the primary condenser 16 is increased to a value greater than a predetermined temperature, the secondary condenser 26 and the cooling fan 23 cool the primary condenser 16 using air which is outside of the clothes dryer, and radiate additional thermal energy inside of the heat pump cycle. In this case, an installation cost of the secondary condenser 26 and the cooling fan 23 may increase fabrication costs.

FIG. 4 is a graph illustrating pressure-time relation when a constant speed type compressor is turned on/off. In a related art method for controlling a constant speed type compressor, as shown in FIG. 4, when a condensation pressure of a condenser reaches a reference value, the compressor may be temporarily stopped. Then, the compressor may be restarted such that the condensation pressure is maintained at a level less than the reference value. However, as the compressor may be stopped and restarted repeatedly, a drying time may be increased. This may cause energy for driving the circulation fan and the drum to be wasted.

BRIEF DESCRIPTION OF THE DRAWINGS

Embodiments will be described in detail with reference to the following drawings in which like reference numerals refer to like elements, and wherein.

DETAILED DESCRIPTION

Description will now be given in detail of a condensing type clothes dryer having a heat pump cycle and a method for controlling a condensing type clothes dryer having a heat pump cycle according to embodiments, with reference to the accompanying drawings. For the sake of brief description with reference to the drawings, the same or like components will be provided with the same or like reference numbers, and description thereof will not be repeated. A singular expression in the specification includes a plural meaning unless it is contextually definitely represented.

Embodiments relate to a condensing type clothes dryer capable of controlling an evaporation pressure and a condensation pressure which increase as a drying process is executed, to be less than predetermined values, and a method for controlling a condensing type clothes dryer having a heat pump cycle.

Figure 1:
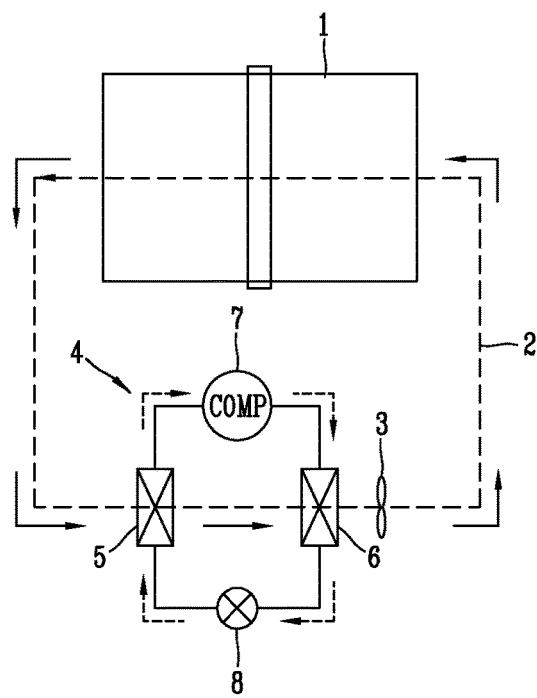
FIG. 1 is a schematic view of a related art condensing type clothes dryer to which a heat pump cycle is applied.
Figure 2:
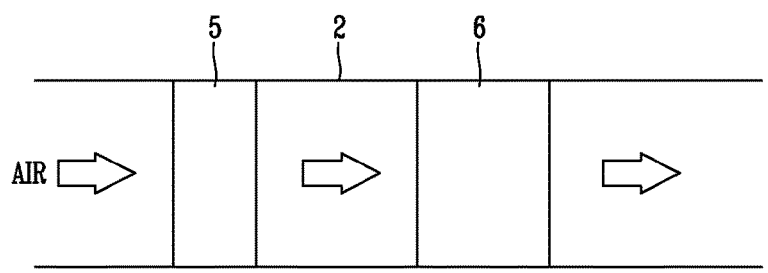
FIG. 2 is a schematic view illustrating a flow of air passing through an evaporator and a condenser, in a related art condensing type clothes dryer to which a heat pump cycle is applied.
Figure 3:
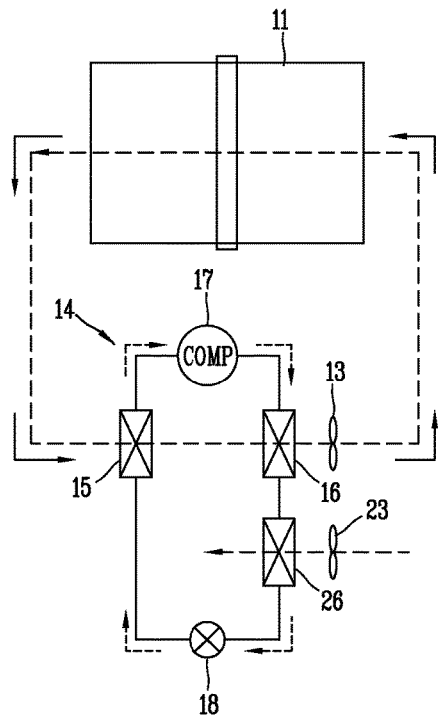
FIG. 3 is a view illustrating that a secondary condenser and a cooling fan may be added to a heat pump cycle applied to a related art condensing type clothes dryer.
Figure 4:
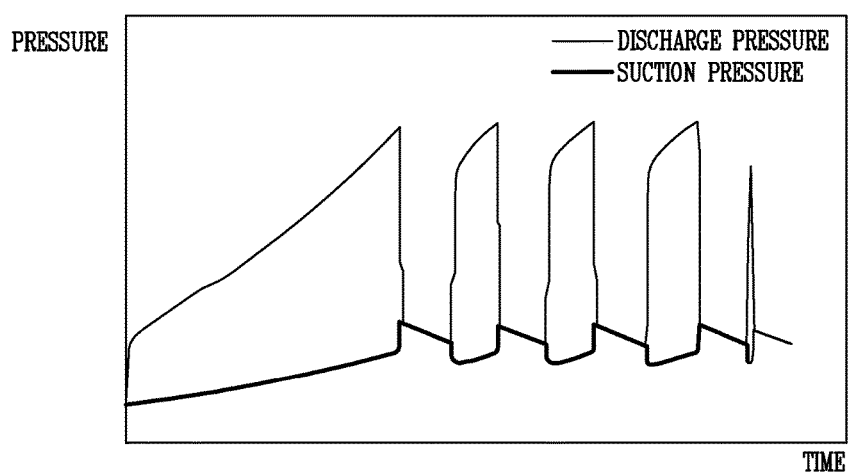
FIG. 4 is a graph illustrating pressure-time relation when a constant speed type compressor is turned on/off.
Figure 5:
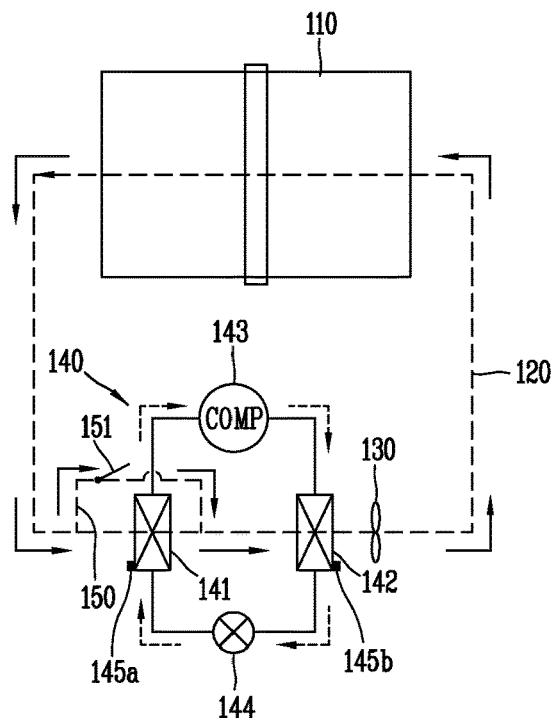
FIG. 5 is a schematic view of a condensing type clothes dryer having a heat pump cycle according to an embodiment.

FIG. 5 is a schematic view of a condensing type clothes dryer having a heat pump cycle according to an embodiment. The condensing type clothes dryer according to an embodiment may include a case, and a drum 110 in which an object to be dried may be accommodated. The case may form an outer appearance of the condensing type clothes dryer, and may be provided with a circular opening on a front surface thereof. An object to be dried may be introduced through the opening. A door may be hinge-coupled to one side of the front surface of the case, to open and close the opening.

The case may be provided with a control panel, which may be provided at a front upper end of the case, for facilitation of a user's manipulation. The control panel may be provided with an input through which various functions of the clothes dryer, for example, may be input, and a display that displays an operation state of the clothes dryer during a drying function.

The drum 110 may have a cylindrical shape. The drum 110 may be rotatably installed in the case, in a horizontally-laid state. The drum 110 may be driven using a rotational force of a drive motor as a drive source. A belt (not shown) may be wound on an outer circumferential surface of the drum 110, and a portion of the belt may be connected to an output shaft of the drive motor. With such a configuration, once the drive motor is driven, a drive force may be transmitted to the drum 110 through the belt, thereby rotating the drum 110.

A plurality of lifters may be installed in the drum 110, and an object to be dried, such as wet clothes (laundry) having been completely washed, may be rotated by the plurality of lifters when the drum 110 is rotated. Then, the object to be dried may be dropped within the drum 110 by gravity from a top of a rotation orbit trajectory (tumbling operation). As such processes may be repeatedly performed, the object to be dried may be dried in the drum 110. This can shorten a drying time and enhance a drying efficiency.

The condensing type clothes dryer may be provided with the circulation duct 120 forming an air circulating passage in the case such that air circulates via the drum 110. The circulation duct 120 may include first, second, and third ducts. The first duct may connect an outlet of a condenser 142 with a rear surface of the drum 110 (an inlet of the drum 110), so air discharged from the condenser 142 may be introduced into the drum 110. The second duct may connect an inlet of an evaporator 141 with a front surface of the drum 110 (an outlet of the drum 110 based on an air flow direction), so air discharged from the drum 110 may be introduced into the inlet of the evaporator 141. The third duct may connect an outlet of the evaporator 141 with an inlet of the condenser 142, so air discharged from the evaporator 141 may be introduced into the inlet of the condenser 142. Air may circulate through the condenser 142, the drum 110, and the evaporator 141 through the circulation duct 120, including the first to third ducts.

The condensing type clothes dryer may include a circulation fan 130 configured to circulate air along the circulation duct 120. The circulation fan 130 may be connected to a drive motor. More specifically, a belt may be connected to a first side or end of an output shaft of the drive motor, and the circulation fan 130 may be connected to a second side or end of the output shaft.

The condensing type clothes dryer may be provided with the heat pump cycle 140. The heat pump cycle 140 may be configured to absorb heat from a low-temperature heat source, such as air, discharged from the outlet of the drum 110, to store a high temperature-heat source in an operation fluid (a refrigerant), and to radiate heat to air introduced into the inlet of the drum 110. With such a configuration, heat discarded through air discharged from the drum 110 may be collected, and the collected heat may be used to heat air introduced into the drum 110.

The heat pump cycle 140 may include the evaporator 141, the condenser 142, a compressor 143, and an expansion device 144. The heat pump cycle 140 may be provided with a circulation pipe along which an operation fluid (a refrigerant) may circulate. The circulation pipe may be separately formed from the circulation duct 120. A refrigerant may circulate through the evaporator 141, the condenser 142, the compressor 143, and the expansion device 144, as the evaporator 141, the condenser 142, the compressor 143, and the expansion device 144 may be connected to each other by the circulation duct 120. The circulation duct 120 and the circulation pipe may commonly pass through the evaporator 141 and the condenser 142. That is, air of the circulation duct 120 and a refrigerant of the circulation pipe may commonly pass through the evaporator 141. Accordingly, the air and the refrigerant may perform heat exchange at the evaporator 141.

A pressure sensor 145a may be installed in or at the evaporator 141 that measures an evaporation pressure. A pressure sensor 145b may be installed in or at the condenser 142 to measure a condensation pressure.

The evaporator 141 may be a fin and tube-type heat exchanger including a plurality of heat transfer plates and a plurality of heat transfer pipes having a refrigerant passage. The plurality of heat transfer plates may be spaced from each other in a direction crossing an air moving direction, and provided so as to extend perpendicular to a ground surface. With such a configuration, air may pass through an air passage formed between the plurality of heat transfer plates when passing through the evaporator. The plurality of heat transfer pipes may have therein a refrigerant passage along which a refrigerant may flow. The plurality of heat transfer pipes may be coupled to the plurality of heat transfer plates in a penetrating manner, and the plurality of heat transfer pipes may be spaced from each other in a vertical direction. The plurality of heat transfer pipes may be connected to each other by a plurality of connection pipes bent in a semi-circular shape. As the plurality of heat transfer pipes penetrate the plurality of heat transfer plates a plurality of times, a contact area between the plurality of heat transfer plates and air may be increased. The plurality of heat transfer plates may increase a heat transfer area between a refrigerant of the plurality of heat transfer pipes and air, and exchange heat transferred from the plurality of heat transfer pipes with heat of air by contacting the plurality of heat transfer pipes.

Air may pass through the evaporator 141 as follows. Air may be introduced into an inlet of an air passage of the evaporator 141, may move along the air passage, and then may be discharged to an outlet of the air passage of the evaporator 141. A refrigerant may pass through the evaporator 141 as follows. A refrigerant may be introduced into an inlet of a refrigerant passage of the evaporator 141, may move along the refrigerant passage, and then may be discharged to an outlet of the refrigerant passage of the evaporator 141. As the air passage between the plurality of heat transfer plates may be separated from the refrigerant passage by the heat transfer pipe, air and a refrigerant may be heat-exchanged with each other without being mixed with each other.

The condenser 142 may have a same configuration as the evaporator 141. Even if the condenser 142 has a different operation from the evaporator 141, it may also be a heat exchanger for heat exchange or heat transfer between air and a refrigerant. The evaporator 141 or the condenser 142 may be a plate-type heat exchanger in which first heat transfer plates having an air passage and second heat transfer plates having a refrigerant passage may be alternately laminated on each other.

In the condensing type clothes dryer, a temperature of air discharged from the outlet of the drum 110 may be lower than a temperature of air introduced into the inlet of the drum 110. However, the temperature of the air discharged from the outlet of the drum 110 may be sufficient for the evaporator 141 to absorb heat of air discharged from the outlet of the drum 110.

The evaporator 141 may be installed in or along the circulation duct 120. The evaporator 141 may be connected to the outlet of the drum 110 by the circulation duct 120 (second duct), thereby absorbing heat from air discharged from the outlet of the drum 110. That is, heat of air may be transferred to a refrigerant at the evaporator 141. Air at the outlet of the drum 110 may be cooled as its thermal energy may be lost at the evaporator 141, and then discharged from the outlet of the evaporator 141. As the air discharged from the outlet of the drum 110 may be in a humid state, the evaporator 141 may execute a dehumidifying process by cooling the air discharged from the outlet of the drum 110. On the other hand, a refrigerant may be heated as it absorbs thermal energy at the evaporator 141, and then may be discharged from the outlet of the evaporator 141.

The condenser 142 may be installed in or along the circulation duct 120. The condenser 142 may be spaced from the evaporator 141 in the circulation duct 120. The condenser 142 may be connected to the outlet of the evaporator 141 by the circulation duct (third duct), so air discharged from the evaporator 141 may be introduced into the inlet of the condenser 142. A refrigerant passing through the condenser 142 may receive heat from air at the outlet of the drum 110, and may transfer the heat to air at the condenser 142. The air introduced into the condenser 142 may be heated in the condenser 142, may be discharged from the outlet of the condenser 142, and may be introduced into the inlet of the drum 110. On the other hand, a refrigerant may radiate heat in the condenser 142, and may be condensed into a liquid state. Then, the refrigerant may be discharged from the outlet of the condenser 142. When the refrigerant has a state change from a gaseous state of high temperature and high pressure to a liquid state of high temperature and high pressure, condensation latent heat is generated. The generated condensation latent heat may be radiated to air introduced into the drum 110, and the radiated heat may be used to heat air introduced into the drum 110.

In order to transfer heat from the evaporator 141 (a low temperature component that receives heat) to the condenser 142 (a high temperature component that radiates heat), driving energy is required. In an embodiment, electric energy may be used as the driving energy. The electric energy may be used to drive the compressor 143 to compress an operation fluid (a refrigerant) of the heat pump cycle 140. Alternatively, thermal energy may be used as the driving energy. For instance, an absorption type heat pump using vapor, high temperature water, or combustion gas, for example, may be used. Still alternatively, a drive force may be obtained from an engine that directly combusts fuel, and then may be used to drive the compressor 143 to compress a refrigerant. Still alternatively, a heat pump may be operated using an engine that combusts a gas. Still alternatively, a drive force may be obtained from a stirling engine driven by a heat source. The heat pump system has an advantage in that a larger amount of energy than driving energy is supplied in the form of thermal energy. This may enhance energy efficiency.

The vapor compression type heat pump cycle 140, driven by electric energy, may include of the compressor 143, the condenser 142, the expansion device 144, and the evaporator 141. The compressor 143 may be connected to each of the evaporator 141 and the condenser 142 by a circulation pipe. The circulation pipe may include first to fourth pipes. The first pipe may connect the evaporator 141 with the compressor 143, so a gaseous refrigerant of low temperature and low pressure, evaporated from the evaporator 141, may be discharged from the outlet of the evaporator 141.

The compressor 143 may compress a gaseous refrigerant of low temperature and low pressure, into a high pressure gas having a higher temperature than air discharged from the drum 110. The compressor 143 may radiate heat to air introduced into the drum 110 from the refrigerant of high temperature and high pressure. Such heat radiation may be executed in the condenser 142, and the refrigerant may be cooled to become a liquid of high pressure. If the refrigerant is depressurized by the expansion device 144, such as an expansion valve or a capillary tube, for example, the temperature of the refrigerant may be drastically lowered. As a result, the refrigerant may be converted into a saturated refrigerant of low temperature and low pressure. If the refrigerant of low temperature absorbs heat from air at the outlet of the drum 110, the refrigerant may be converted into a gas of low temperature and low pressure. If the gas of low temperature and low pressure is transferred to the compressor 143, the heat pump cycle 140, by which heat absorbed by the evaporator 141 is radiated by the condenser 142, may be implemented.

Figure 6:
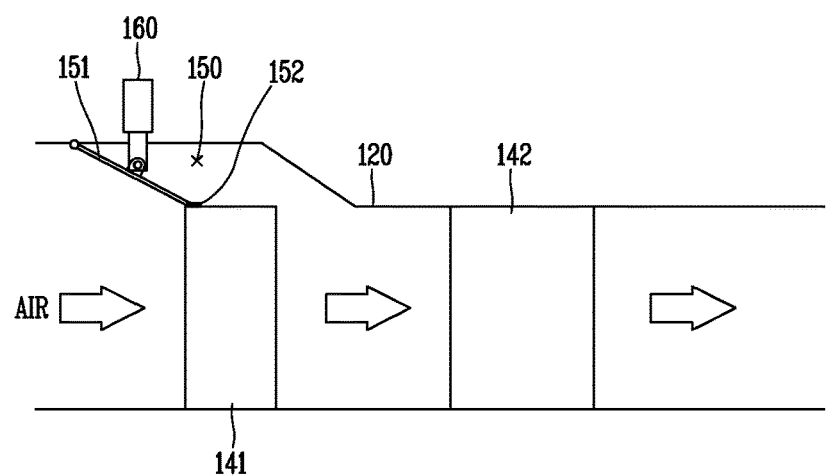
FIG. 6 is a view illustrating a bypass flow path in a closed state in a circulation duct according to an embodiment.
Figure 7:
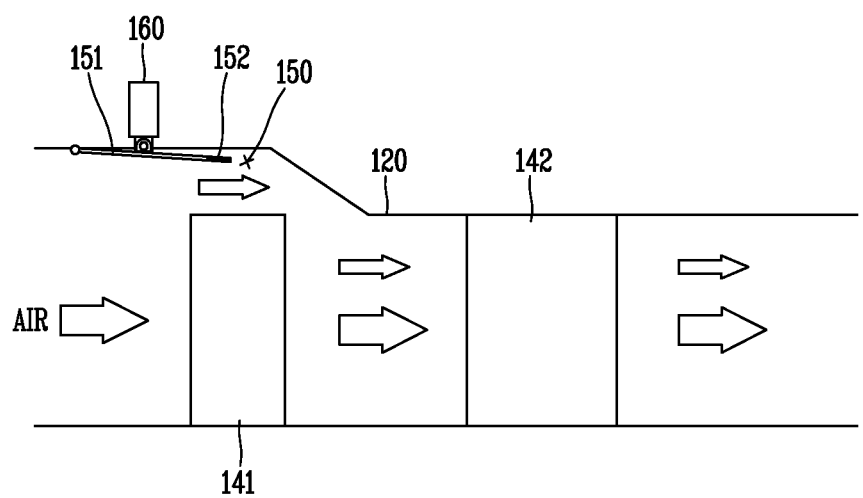
FIG. 7 is a view illustrating the bypass flow path of FIG. 6 in an open state.
Figure 8:
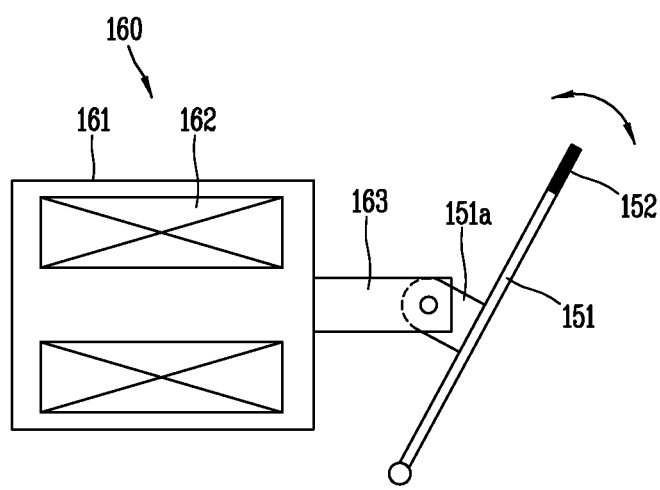
FIG. 8 is a schematic view illustrating an opening and closing device configured to open and close the bypass flow path according to an embodiment.
Figure 9:
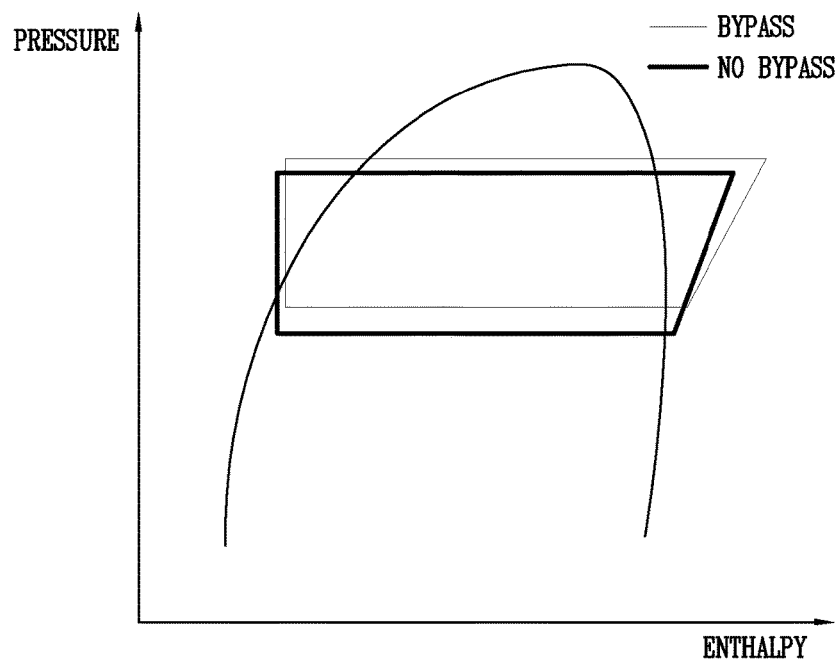
FIG. 9 is a graph illustrating pressure-enthalpy (PH) relation when there is a bypass flow path and when there is no bypass flow path.

The condensing type clothes dryer according to an embodiment may include a bypass flow path 150 configured to control an evaporation pressure and a condensation pressure to be less than predetermined values, using a basic characteristic of the heat pump cycle 140. FIG. 6 is a view illustrating a bypass flow path in a closed state in a circulation duct according to an embodiment. FIG. 7 is a view illustrating the bypass flow path of FIG. 6 in an open state. FIG. 8 is a schematic view illustrating an opening and closing device configured to open and close the bypass flow path according to an embodiment. FIG. 9 is a graph illustrating a pressure-enthalpy (PH) relation when there is the bypass flow path and when there is no bypass flow path.

A bypass flow path 150 may be formed at or in the circulation duct 120, such that a portion of the air discharged from the drum 110 may bypass the evaporator 141 to thus be mixed with air having passed through the evaporator 141 at an upstream side of the condenser 142. As the air discharged from the outlet of the drum 110 may be introduced into the inlet of the drum 110 via the evaporator 141 and the condenser 142, the upstream side of the condenser 142 may refer to a space between the evaporator 141 and the condenser 142 in the circulation duct 120.

The bypass flow path 150 may be part of the circulation duct 120. The bypass flow path 150 may be formed inside of or outside of the circulation duct 120. The bypass flow path 150 shown in FIG. 6 may be formed in the circulation duct 120. The bypass flow path 150 may have a structure in which a sectional area of a portion of the circulation duct 120 is larger than a sectional area of the evaporator 141 at a location of the evaporator 141 and equal to a sectional area of the condenser 142 adjacent an inlet of the condenser 142, based on a direction crossing an air flow direction in the circulation duct 120 at which the evaporator 141 is positioned. That is, the bypass path 150 may be formed by enlarging a sectional area of a portion of the circulation duct 120 larger than a sectional area of the evaporator 141 at a location corresponding to the evaporator 141 and then reducing the sectional area of the circulation duct 120 until it is equal to a sectional area of the condenser 142 adjacent an inlet of the condenser 142, with respect to a direction crossing an air flow direction in the circulation duct 120 in which the evaporator 141 is positioned.

That is, in order to form the bypass flow path 150 in the circulation duct 120, the sectional area of the circulation duct 120 at which the evaporator 141 is positioned may be larger than the sectional area of the evaporator 141, in a direction perpendicular to an air flow direction. As a result, a gap may be generated between the circulation duct 120 and the evaporator 141. For example, a diameter of a portion of the circulation duct 120 at which the evaporator 141 is installed may be increased. The term "diameter of the circulation duct 120" may mean a horizontal length or a height of the circulation duct 120, in a case in which the circulation duct 120 has a quadrangular sectional surface. In the case in which the circulation duct 120 has a quadrangular sectional surface, as a height of the circulation duct 120 may be higher than a height of the evaporator 141, the evaporator 141 may contact a bottom surface of the circulation duct 120, and a gap may be formed above the evaporator 141. Accordingly, the bypass flow path 150 may be formed above the evaporator 141 with respect to a gravitational direction. If the bypass flow path 150 is open, a portion of the air may bypass the evaporator 141. In this case, if air discharged from the drum 110 has a temperature of about 40° C., the air may become light due to a low density. The air may move upward in the circulation duct 120. Accordingly, the bypass flow path 150 may be formed above the evaporator 141.

The bypass flow path 150 may have a smaller sectional area toward a downstream side of the evaporator 141. With such a configuration, air having bypassed the evaporator 141 may be mixed with air having passed through the evaporator 141.

The bypass flow path 150 of FIG. 6 may be formed above the evaporator 141, but may also be formed at various positions. For example, the bypass flow path 150 may be formed below the evaporator 141, or may be formed above and below the evaporator 141. Alternatively, the bypass flow path 150 may be formed between a side surface of the evaporator 141 and the circulation duct 120. Alternatively, the bypass flow path 150 may be formed to pass through an inside of the evaporator 141.

The bypass flow path 150 shown in FIG. 5 may be formed to be diverged from the circulation duct 120, to extend to the outside of the circulation duct 120, and to be combined with the circulation duct 120. For example, the bypass flow path 150 may be diverged from an upstream side of the evaporator 141 of the circulation duct 120 and may be combined with a downstream side of the evaporator 141, such that air may bypass the evaporator 141 to be mixed with air at the condenser 142. In this case, one side of the bypass flow path 150 may communicate with the upstream side of the evaporator 141, and another side thereof may communicate with a space between the downstream side of the evaporator 141 and the upstream side of the condenser 142. The upstream side of the evaporator 141 may be the inlet of the evaporator 141, and the downstream side of the evaporator 141 may be the outlet of the evaporator 141.

The condensing type clothes dryer may include an opening and closing device configured to selectively open and close the bypass flow path 150. The opening and closing device may include a damper 151 coupled to the bypass flow path 150 by a hinge, and an actuator configured to drive the damper 151. The damper 151 may be a plate of a predetermined size. As a first end of the damper 151 may be hinge-coupled to the bypass flow path 150 and a second end of the damper 151 may be rotated, the bypass flow path 150 may be opened or closed. A sealing member 152 having elasticity may be provided at the second end of the damper 151, thereby preventing air from being introduced into the bypass flow path 150.

The actuator may be a solenoid 160 or a solenoid valve. The solenoid 160 may include a housing 161, a coil 162, and a plunger 163. The coil 162 may be installed in the housing 161. Once power is supplied to the coil 162, magnetism may be generated from a magnetic circuit which may enclose the coil 162. A magnetic field of the magnetic circuit may generate a magnetic force at the plunger 163, thereby instantaneously moving the plunger 163.

A connection portion 151*a* that connects with the solenoid 160 may be formed on a rear surface of the damper 151. As the plunger 163 of the solenoid 160 may be hinge-coupled to the connection portion 151*a* and a drive force generated from the solenoid 160 may be transferred to the damper 151, the damper 151 may be smoothly rotated. The actuator may be a motor or a cylinder, as well as the solenoid 160. If the damper 151 is opened or closed by the motor and the cylinder, an open degree of the damper 151 may be precisely controlled.

The damper 151 of FIG. 6 is configured to be operated by the solenoid 160. In a case of closing the bypass flow path 150, the solenoid 160 installed at the bypass flow path 150 may be turned on to close the bypass flow path 150, which may be provided above the evaporator 141, as shown in FIG. 6. In this case, air discharged from the drum 110 may pass through the evaporator 141 and the condenser 142, sequentially. An amount of the air passing through the evaporator 141 may be the same as an amount of the air passing through the condenser 142.

When opening the bypass flow path 150, the solenoid 160 installed at the bypass flow path 150 may be turned off. As a result, the damper 151 may be moved upward in an opening direction by air flow, as shown in FIG. 7. In this case, a portion of air discharged from the drum 110 may be introduced into the bypass flow path 150 having a small flow resistance, and the rest of the air may pass through the evaporator 141. The amount of air passing through the evaporator 141 may be smaller than the amount of air passing through the condenser 142. The reason being, as air moving along the bypass flow path 150 may bypass the evaporator 141 to be mixed with air at the upstream side of the condenser 142, a sum of an amount of the air flowing along the bypass flow path 150 and the amount of the air passing through the evaporator 141 may be the same as the amount of the air passing through the condenser 142.

When the damper 151 is open, a portion of wet air at the inlet of the evaporator 141 may be bypassed. This may reduce thermal energy of the evaporator 141, resulting in a lowering of an evaporation pressure. Further, as air which should pass through the evaporator 141 passes through the bypass flow path 150 having a relatively small flow resistance, a flow resistance of the entire air flow may be reduced. This may increase an air volume. A radiation function may be enhanced as an amount of air passing through the condenser 142 is increased. With such effects, a condensation pressure may be maintained as a value less than a reference pressure, as shown in FIG. 9. Further, even if a constant speed type compressor is used, the cycle may be continuously operated, and a drastic decrease in dehumidifying efficiency may be prevented.

Figure 10:
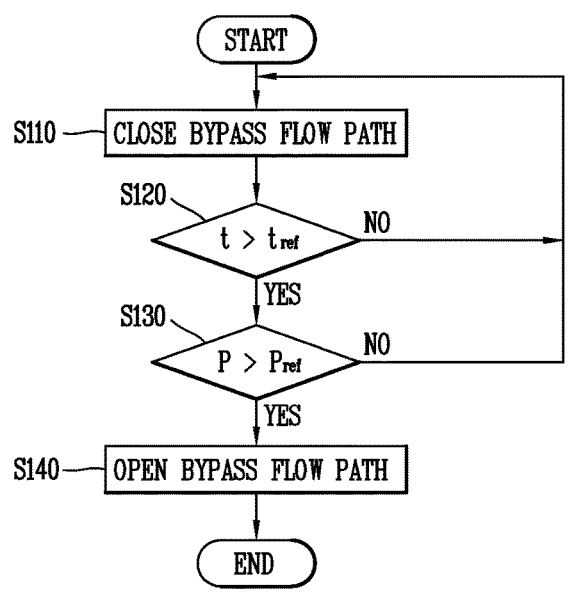
FIG. 10 is a flowchart of a method for controlling a condensing type clothes dryer having a heat pump cycle according to an embodiment.

FIG. 10 is a flowchart of a method for controlling a condensing type clothes dryer having a heat pump cycle according to an embodiment. The method for controlling a condensing type clothes dryer having a heat pump cycle according to an embodiment may be a method for controlling an evaporation pressure of an evaporator, such as evaporator 141 of FIG. 5, to be a value less than a predetermined pressure, by controlling an open degree of a bypass flow path, such as bypass flow path 150 of FIG. 5.

The condensing type clothes dryer may include a circulation duct, such as circulation duct 120 of FIG. 5, which may form a circulation passage such that air may circulate via a drum, such as drum 110 of FIG. 5. The condensing type clothes dryer may also include a heat pump cycle, such as heat pump cycle 140 of FIG. 5 having evaporator 141 and a condenser, such as condenser 142 of FIG. 5, spaced from each other in the circulation duct and passing air therethrough and the heat pump cycle configured to absorb heat of air discharged from the drum through the evaporator, and to transfer the heat to air introduced into the drum through the condenser using an operation fluid which circulates via the evaporator and the condenser.

The condensing type clothes dryer may include a temperature sensor and a humidity sensor configured to sense a temperature and a humidity at the inlet and the outlet of the drum. Temperature and humidity are control factors required during a drying process. Further, the condensing type clothes dryer may include a pressure sensor, such as pressure sensor 145*a* or 145*b* of FIG. 5, configured to measure an evaporation pressure of the evaporator and/or a condensation pressure of the condenser. Further, the condensing type clothes dryer may include a temperature sensor configured to measure an outlet temperature of each of the evaporator, the condenser, and a compressor, such as compressor 143 of FIG. 5. The pressure sensor may be installed at each of the evaporator and the condenser, thereby sensing an evaporation pressure and a condensation pressure.

The condensing type clothes dryer according to an embodiment may include a controller, and the controller may be configured to control an open degree of a bypass flow path by receiving a detection signal from the pressure sensor. The method for controlling the condensing type clothes dryer according to an embodiment will be explained hereinafter.

As a predetermined period of time lapses after the condensing type clothes dryer is operated (S120), a temperature of air discharged from the outlet of the drum may gradually increase. This may increase an evaporation pressure of the evaporator and a condensation pressure of the condenser. The pressure sensor may be configured to sense at least one of the evaporation pressure or the condensation pressure.

The controller may compare the sensed pressure with a reference pressure (S130). If the sensed pressure is equal to or smaller than the reference pressure as a result of the comparison, the controller may transmit a control signal ('ON' signal) to a solenoid, such as solenoid 160 of FIG. 6, such that air discharged from the drum may be introduced into the inlet of the evaporator, thereby closing a damper, such as damper 151 of FIG. 6 (S110).

If the damper, such as damper 151 of FIG. 6 is closed, air discharged from the drum may pass through the evaporator. During this process, heat of the air introduced into an air passage of the evaporator may be transferred to a refrigerant introduced into a refrigerant passage of the evaporator. With such a configuration, wet air discharged from the drum may be cooled by the evaporator to thus be dehumidified. The air cooled by the evaporator may be discharged from the air passage, thereby being introduced into the condenser. All of the air discharged from the evaporator may be introduced into the condenser. The air introduced into an air passage of the condenser may be heated by receiving heat from a refrigerant introduced into a refrigerant passage of the condenser, and then may be introduced into the inlet of the drum.

In contrast, if the sensed pressure is larger than the reference pressure as a result of the comparison (S130), the bypass path may be opened (S140) and the air discharged from the drum may be distributed to the bypass flow path and the evaporator formed at the circulation duct. With such a configuration, air introduced through the bypass flow path may bypass the evaporator, thereby mixing with air having passed through the evaporator at the upstream side of the condenser.

Embodiments disclosed herein provide a condensing type clothes dryer having a heat pump cycle, capable of resolving issues with conventional structure in which there is no gap between a circulation duct and a heat exchanger, by lowering an evaporation pressure and a condensation pressure which increase as a drying process is executed, to a value less than a required pressure, and a method for controlling a condensing type clothes dryer having a heat pump cycle.

Embodiments disclosed herein provide a condensing type clothes dryer having a heat pump cycle that may include a drum where an object to be dried may be accommodated; a circulation duct which forms a circulation passage such that air may circulate via the drum; a circulation fan configured to circulate the air along the circulation duct; a heat pump cycle having an evaporator and a condenser spaced from each other in the circulation duct, and configured to absorb heat of air discharged from the drum through the evaporator, and to transfer the heat to air introduced into the drum through the condenser, using an operation fluid which may circulate via the evaporator and the condenser; a bypass flow path formed at or in the circulation duct such that part or a portion of the air discharged from the drum may bypass the evaporator to be mixed with air having passed through the evaporator at an upstream side of the condenser; and an opening and closing device installed at the bypass flow path and configured to selectively open or close the bypass flow path.

The bypass flow path may be formed in the circulation duct. The bypass flow path may be formed above the evaporator. The bypass flow path may have a structure where a sectional area of part of the circulation duct becomes larger than that of the evaporator and then becomes small at an inlet of the condenser, based on a direction crossing an air flow direction in the circulation duct where the evaporator is positioned.

The opening and closing device may include a damper coupled to the bypass flow path by a hinge, and configured to open and close the bypass flow path; and an actuator configured to rotatably drive the damper. The actuator may be a solenoid. The solenoid may include a housing having a coil therein and a plunger connected to a rear surface of the damper and moveably installed at the housing. When power to the coil is turned on, the plunger may be operated and thus a closed state of the damper may be maintained. When power to the coil is turned off, the damper may be open by air flow. The heat pump cycle may include a circulation pipe which forms a circulation passage such that the operation fluid may circulate via the evaporator and the condenser; a compressor installed at the circulation pipe and configured to compress the operation fluid discharged from the evaporator and to transfer the operation fluid to the condenser; and an expansion device installed at the circulation pipe and configured to reduce a pressure of the operation fluid discharged from the condenser and to transfer the operation fluid to the evaporator.

Embodiments disclosed herein further provide a method for controlling a condensing type clothes dryer that may include a circulation duct which may form a circulation passage such that air circulates via the drum; and a heat pump cycle having an evaporator and a condenser spaced from each other in the circulation duct and configured to absorb heat of air discharged from the drum through the evaporator and to transfer the heat to air introduced into the drum through the condenser by using an operation fluid which circulates via the evaporator and the condenser. The method may include sensing at least one of an evaporation pressure of the evaporator or a condensation pressure of the condenser, comparing the sensed pressure with a reference pressure, and either passing air discharged from the drum through the evaporator and the condenser or distributing air inside the circulation duct to a bypass flow path and the evaporator such that at least part of the air discharged from the drum bypasses the evaporator through the bypass flow path formed at the circulation duct to thus be mixed with air having passed through the evaporator at an upstream side of the condenser.

The distributing may include controlling an open degree of the bypass flow path when the evaporation pressure and the condensation pressure are increased. The distributing may include controlling an open degree of the bypass flow path when at least one of the evaporation pressure or the condensation pressure is more than a reference pressure. The open degree of the bypass flow path may be controlled by a damper rotatably installed to open and close the bypass flow path, and an actuator configured to drive the damper.

Embodiments disclosed herein may have at least the following advantages. First, as a portion of wet air provided at an inlet of the evaporator may be bypassed, an evaporation pressure of the evaporator may be lowered. Second, as air which should pass through the evaporator may pass through the bypass flow path having a relatively small flow resistance, a flow resistance of all of the air may be reduced. This may increase an air volume. Third, a radiation function may be enhanced as a flow amount of air passing through the condenser may be increased. The method for controlling a condensing type clothes dryer having a heat pump cycle may have at least the following advantages. First, as a portion of the wet air discharged from the drum may be introduced into the bypass flow path at the upstream side of the evaporator to bypass the evaporator, an evaporation pressure may be lowered to a value less than a predetermined pressure. Second, as the amount of air passing through the bypass flow path having a small flow resistance may be larger than the amount of air passing through the evaporator, a flow amount of air passing through the condenser may be increased to enhance radiation performance. This may allow a condensation pressure to be maintained at a level less than a reference pressure.

With such effects, a condensation pressure may be maintained as a value less than a reference pressure. Further, as the cycle may be continuously operated, a drying time may be shortened and energy may be saved. Furthermore, increase of an evaporation pressure and a condensation pressure may be prevented without using an inverter compressor or additionally mounting a secondary compressor, for example. This may reduce fabrication costs.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A condensing type clothes dryer having a heat pump cycle, comprising:
    a drum in which an object to be dried is accommodated;
    a circulation duct that forms a circulation passage such that air circulates via the drum;
    a circulation fan configured to circulate the air along the circulation duct;
    a heat pump cycle having an evaporator and a condenser spaced from each other in the circulation duct, wherein the heat pump cycle is configured to absorb heat from the air discharged from the drum through the evaporator and to transfer the heat to air introduced into the drum through the condenser using an operation fluid that circulates via the evaporator and the condenser;
    a bypass flow path formed at the circulation duct such that a portion of the air discharged from the drum bypasses the evaporator to be mixed with air having passed through the evaporator at an upstream side of the condenser;
    a first pressure sensor installed in the evaporator that measures an evaporation pressure;
    a second pressure sensor installed in the condenser that measures a condensation pressure; and
    an opening and closing device provided at the bypass flow path and configured to selectively open or close the bypass flow path, wherein the opening and closing device includes:
        a damper having a first end and a second end, the first end rotatably coupled to the bypass flow path via a hinge, and the second end configured to rotate toward the evaporator;
        a seal provided at the second end of the damper, wherein the seal is configured to contact and cover a portion of the evaporator to prevent air from being introduced into the bypass flow path when the damper is in a closed position, and
        an actuator configured to rotatably drive the damper, wherein the actuator includes a solenoid and wherein the solenoid includes:
            a housing having a coil therein; and
            a plunger connected to a rear surface of the damper, and, moveably provided at the housing, wherein when power to the coil is turned on, the plunger is operated and thus the closed position of the damper is maintained, and wherein when the power to the coil is turned off, the damper is opened by air flow, wherein power to the coil is turned on when either the evaporation pressure or the condensation pressure is equal to or smaller than a reference pressure.

2. The condensing type clothes dryer of claim 1, wherein the bypass flow path is formed in the circulation duct.

3. The condensing type clothes dryer of claim 2, wherein the bypass flow path is formed by enlarging a sectional area of a portion of the circulation duct larger than a sectional area of the evaporator at a location corresponding to the evaporator and then reducing the sectional area of the circulation duct until it is equal to a sectional area of the condenser adjacent an inlet of the condenser, with respect to a direction crossing an air flow direction in the circulation duct in which the evaporator is positioned.

4. The condensing type clothes dryer of claim 1, wherein the bypass flow path is provided above the evaporator.

5. The condensing type clothes dryer of claim 1, wherein the heat pump cycle includes:
    a circulation pipe that forms a circulation passage such that the operation fluid circulates via the evaporator and the condenser;
    a compressor installed in the circulation pipe and configured to compress the operation fluid discharged from the evaporator and to transfer the operation fluid to the condenser; and
    an expansion valve installed in the circulation pipe and configured to lower a pressure of the operation fluid discharged from the condenser and to transfer the operation fluid to the evaporator.

6. A method for controlling a condensing type clothes dryer including a circulation duct that forms a circulation passage such that air circulates via the drum; and a heat pump cycle having an evaporator and a condenser spaced from each other in the circulation duct, configured to absorb heat of air discharged from the drum through the evaporator, to transfer the heat to air introduced into the drum through the condenser, using an operation fluid which circulates via the evaporator and the condenser, the method comprising:
    sensing at least one of an evaporation pressure of the evaporator or a condensation pressure of the condenser;
    comparing the sensed pressure with a reference pressure; and
    at least one of passing air discharged from the drum through the evaporator and the condenser, or distributing air inside of the circulation duct to a bypass flow path and the evaporator such that at least a portion of the air discharged from the drum bypasses the evaporator through the bypass flow path formed at the circulation duct, to thus be mixed with air having passed through the evaporator at an upstream side of the condenser, wherein the distributing includes controlling an open degree of the bypass flow path when the evaporation pressure and the condensation pressure are increased.

7. The method of claim 6, wherein the distributing includes controlling an open degree of the bypass flow path when at least one of the evaporation pressure or the condensation pressure is greater than a reference pressure.

8. The method of claim 6, wherein the open degree of the bypass flow path is controlled by a damper rotatably installed to open and close the bypass flow path, and an actuator configured to drive the damper.

9. The method of claim 8, wherein the damper is set to a closed position when the sensed pressure is equal to or smaller than the reference pressure.

* * * * *